United States Patent [19]

Rigalt

[11] 4,009,465
[45] Feb. 22, 1977

[54] BRAKE LINING WEAR DETECTOR

[76] Inventor: Gonzalo Rigalt, 8a. Avenida No. 3-69, Zona 10 Guatemala City, Guatemala

[22] Filed: Jan. 28, 1974

[21] Appl. No.: 436,926

[52] U.S. Cl. .................... 340/52 A; 200/61.44; 200/61.4
[51] Int. Cl.² ......................... B60T 17/22
[58] Field of Search .......... 340/52 A, 69; 200/61.4, 200/61.44

[56] References Cited

UNITED STATES PATENTS

| | | | |
|---|---|---|---|
| 3,456,236 | 7/1969 | Labartino et al. | 340/52 A |
| 3,479,640 | 11/1969 | Puma | 340/52 A |
| 3,800,278 | 3/1974 | Jaye et al. | 340/52 A |
| 3,805,228 | 4/1974 | Peeples | 340/52 A |

*Primary Examiner*—Alvin H. Waring
*Attorney, Agent, or Firm*—Stevens, Davis, Miller & Mosher

[57] ABSTRACT

A vehicular brake failure detecting device for providing two warning signals independently of each other when brake linings need repair or replacement. With the ignition switch on, a first electrical circuit is closed to provide one alarm; and with the brake pedal depressed, a second alarm is given. The two circuits are closed for the first time when the brake pedal is depressed and a conductive pin, embedded in the brake linings, is exposed to contact a disc rotor or brake drum. Thereafter, the first circuit is closed as long as the ignition switch is on while the second circuit is activated only when the brake pedal is depressed.

11 Claims, 7 Drawing Figures

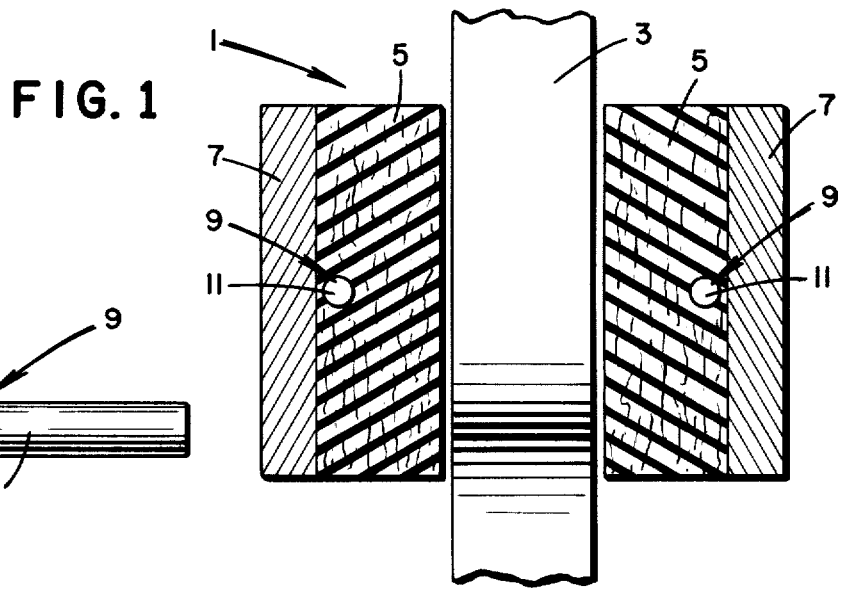
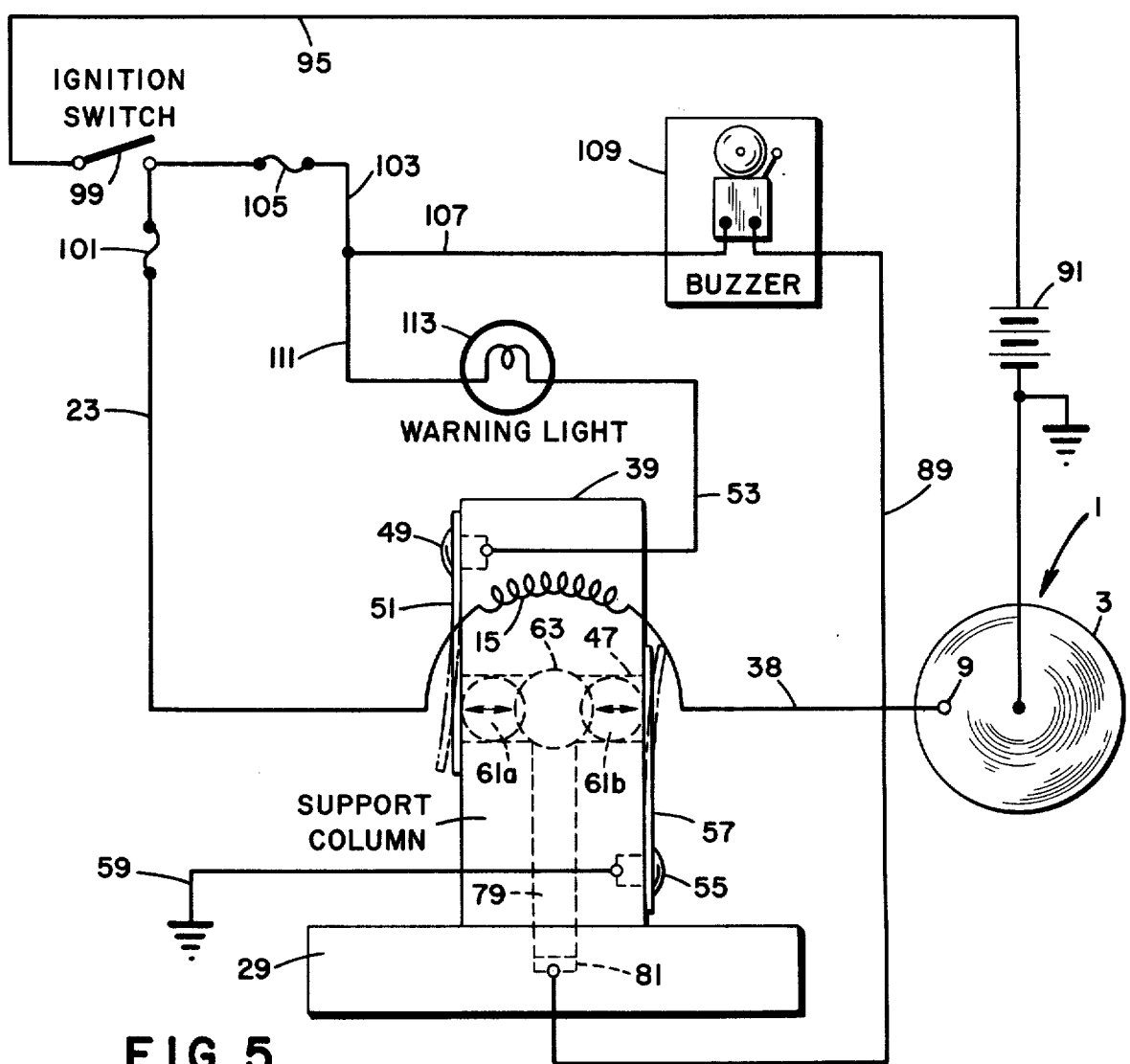

BRAKE LINING WEAR DETECTOR

BACKGROUND OF THE INVENTION

This invention relates to a brake failure warning device and, more particularly, to a device for indicating the condition of the brake linings in an automotive vehicle without requiring visual examination of the brakes.

Safe driving requires that the brake linings comprising the brakes of an automotive vehicle be in good condition so as to ensure satisfactory braking action. However, the wear rate of the brake linings varies depending on several factors including the manner in which the vehicle is driven, thereby making it difficult to estimate without visual examination the condition of the linings. Therefore, periodic time consuming and expensive inspections are needed, even though the linings may be satisfactory, since the brakes cannot be visually examined without removing the wheels and brake housings.

As a result, brake failure warning detectors have been developed which inform the driver of the condition of the linings. These detectors include apparatus that sense when the linings have worn to a point where replacement is necessary and then signal the driver, via an alarm on the dashboard of the vehicle, of this fact. With such detectors, periodic brake inspections are unnecessary and the driver is assured the linings are adequate.

Such known detectors are generally complex in design and operation, and are expensive to manufacture. In addition, many of these detectors require that the brake pedal be depressed before a circuit is closed to activate an alarm. Since the brake pedal is usually not depressed until after the vehicle is in motion, the operator will be unaware that his brakes are defective until he is required to apply them. This type of operation is often unsatisfactory and may be dangerous under certain conditions.

The present invention, on the other hand, provides a brake failure warning device which has few parts, is simple in operation and inexpensive to make. Furthermore, this invention may be easily installed either at the factory when the vehicle is built, or by a user after it has been delivered.

SUMMARY OF THE INVENTION

In accordance with the present invention, when brake linings are in need of repair or replacement, two alarm circuits are provided to warn the driver. One circuit is energized the moment the ignition switch is turned on without requiring the brake pedal to be depressed. Thus, the driver is warned of the brake lining condition even before the vehicle is set in motion. When the brake pedal is depressed, the other circuit is closed as long as the ignition switch is on and the pedal remains depressed.

A conductive pin is positioned a predetermined distance from the brake shoes in the brake linings of a disc or drum brake. The pin is electrically connected to a solenoid having a push rod which extends from the solenoid and is linearly movable with respect to the solenoid when it is energized. In the path of the push rod is a conductive leaf spring and a movable switch rod which is spaced apart from the leaf spring. The switch rod is formed of conductive and non-conductive material and is carried by a support in which it is linearly movable. A pair of steel balls, located within the support, are movable from the non-conductive part of the switch rod to the conductive part when the switch rod is operated.

When a brake lining has first worn to expose the conductive pin, and when the brake pedal is first depressed under this condition, the pin will abut the rotor of the disc brake or drum of the brake drum. With the ignition switch on, a circuit is then closed through the conductive pin, rotor or drum and battery to energize the solenoid. Energization of the solenoid causes the push rod to move the leaf spring and to force the latter into contact with the switch rod. The switch rod then slides in the support to transfer the steel balls from the non-conductive part to the conductive part of the switch rod. With the steel balls resting on the conductive part and when the leaf spring contacts the switch rod, a first electrical circuit is closed to provide a warning signal to the driver. Also, with the steel balls resting on the conductive part another electrical circuit is closed to provide a second warning signal without contact between the leaf spring and switch rod.

When the brake pedal is released, thereby opening the circuit through the conductive pin and rotor or drum, the solenoid is de-energized causing a retraction of the push rod. The leaf spring no longer will abut the switch rod; consequently, the first warning circuit through the leaf spring will be de-energized. However, the switch rod remains in its position with the steel balls located on the conductive part to maintain closed the second alarm circuit as long as the ignition switch is on. The first alarm may be a buzzer while the second alarm may be a visual signal on the dashboard of the automobile. The switch rod will remain in the position with the steel balls on the conductive part until it is reset. Thus, when the brake linings have worn to a condition which requires repair or replacement, a warning signal will be provided when the ignition switch is on while another warning signal will be given when the brake pedal is depressed.

BRIEF DESCRIPTION OF THE DRAWINGS

FIG. 1 illustrates an enlarged, fragmentary side elevation of a disc brake including a part of the brake failure warning device of the present invention.

FIG. 2 is a side view of the conductive pin embedded in the brake lining of FIG. 1.

FIG. 3 is a side view of the switching structure of the present invention.

FIG. 4 illustrates a cross-section of part of the apparatus taken along lines 4—4 of FIG. 3.

FIG. 5 shows a schematic wiring diagram for indicating brake failure.

DETAILED DESCRIPTION OF THE DRAWINGS

Figure 6:
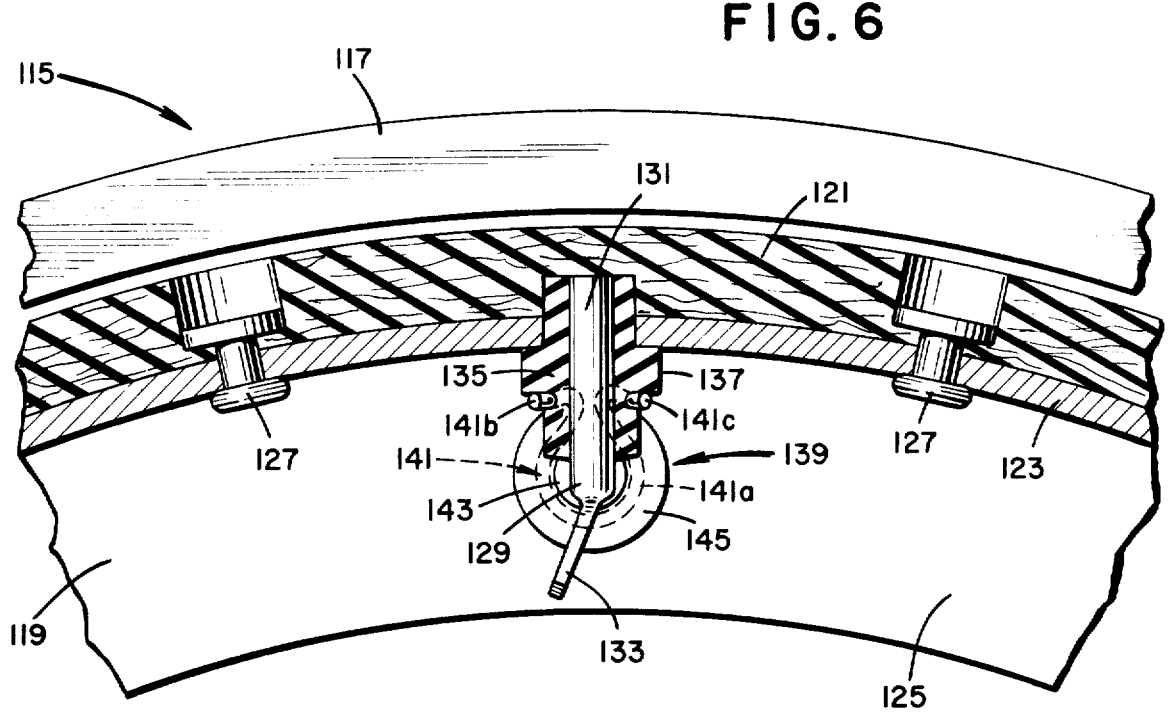
FIG. 6 is an enlarged, fragmentary top elevation of a drum brake including a part of the present invention.

In FIG. 1 there is shown part of a disc brake 1 of a type used on, for example, an automobile. The disc brake 1 includes a rotor 3. Spaced apart from, and on opposite sides of the rotor 3, are a pair of friction pads or brake linings 5 which are attached to respective brake shoes 7. conductive pins 9 are embedded within each of the linings 5 a predetermined distance from the brake shoes 7. As will be more fully described below, conductive pins 9 are part of the alarm apparatus of the present invention which provides warning signals when the brake linings 5 need repair or replacement.

The disc brake 1 may be operated through a conventional brake pedal (not shown). When the brake pedal is depressed, the linings 5 move toward each other to engage opposite sides of the rotor 3 thereby stopping its rotation. After a period of use, the brake linings will have worn to the edge of either or both conductive pins 9, thereby exposing them. As will be more fully described, an electrical circuit will be closed through the conductive pins 9 and rotor 3 when the brake pedal is depressed to abut the pins 9 and rotor 3. Closure of the electrical circuit results in alarms being activated indicating the brake linings have worn to a condition which requires their repair or replacement. As is apparent, the urgency for repair or replacement of the linings 5 is determined by the depth to which the conductive pins 9 are embedded in the linings 5. The further away are the pins 9 from the shoes 7, the more lining will remain when the alarm signals are first given.

FIG. 2 shows a side view of the conductive pins 9. The pins 9 comprise a circular cylindrical conductive portion 11 which is embedded in the linings 5. Connected to the portion 11, and extending out of the linings 5, is a flat conductive portion 13 which is coupled to other parts of the electrical circuitry to be described. Pins 9 may be made of copper, brass or aluminum.

Figures 3, 4:
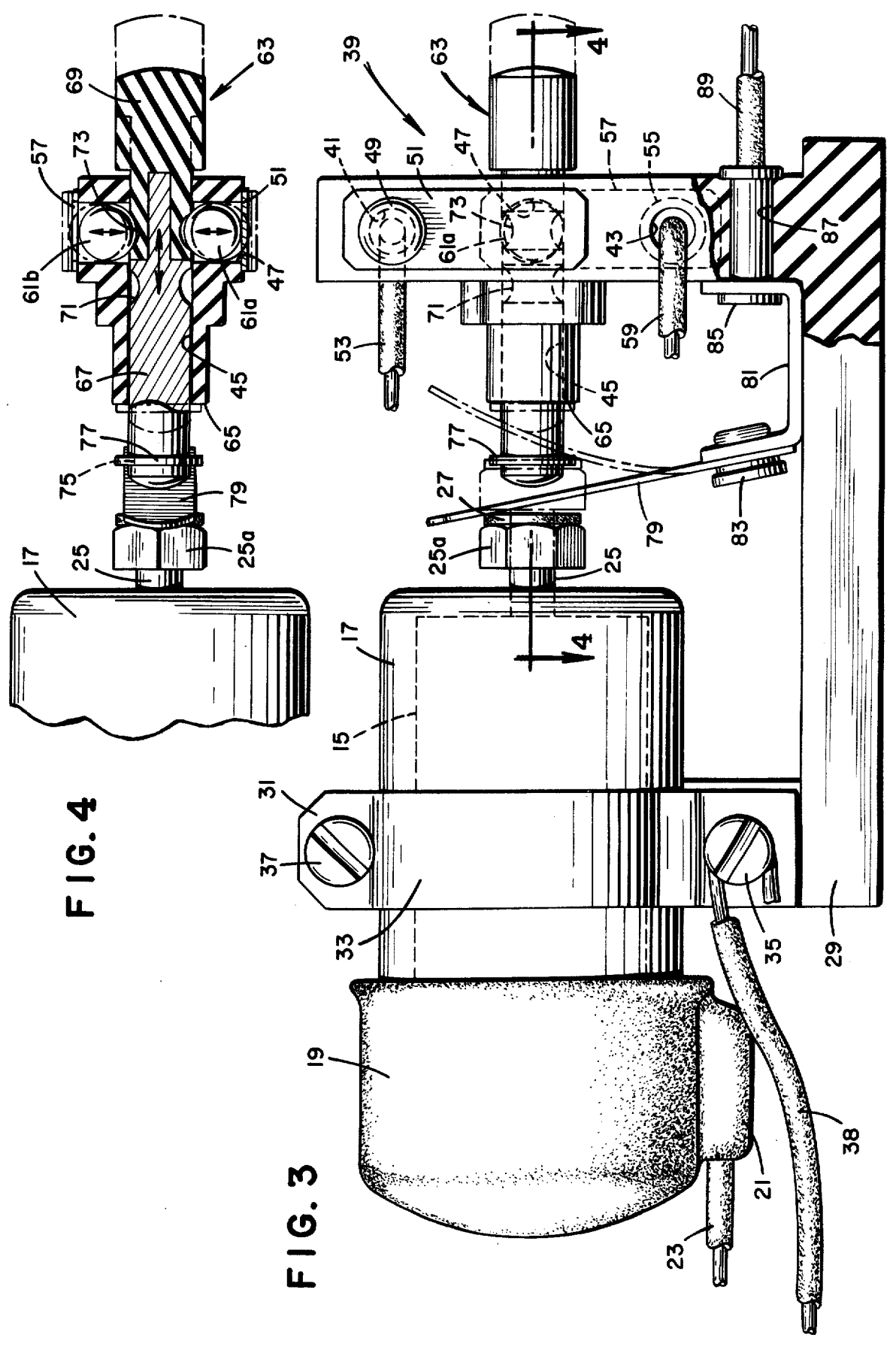

Reference will now be made to FIGS. 3 and 4 showing the switching structure. A solenoid 15 is located within a cylindrical housing 17 which is open at both ends. A rubber jacket 19 covers one end of the housing 17 and includes an apertured flange 21 through which an electrical connection can be made to the solenoid via a wire 23. Positioned within the solenoid 15 and extending through the other end thereof, is a push rod 25 which can slide right and left, as viewed in FIG. 3, along the longitudinal axis of the housing 17. The head 25a of push rod 25 may be made of brass or a non-electrically conductive material. If the head 25a is made of an electrically conductive material, a non-electrically conductive plastic disc 27 should be attached to the face of the head. The housing 17 is connected to one end of a frame 29 by a U-shaped bracket 31 including two arms 33 (only one being shown) connected at their lower part to the frame 29 by screws 35. The arms 33 are connected at their top part by another screw 37. A wire 38 is connected to one of the screws 35 and forms part of the electrical circuit to be described.

A rectangular support column 39 is attached to the other end of frame 29. The support column 39 includes a pair of horizontal apertures 41, 43 extending through the upper and lower parts of the column. Another circular aperture 45 extends horizontally through the column 39 at a point midway between with its axis perpendicular to the axes of the apertures 41, 43. In addition, the column 39 includes, on either side, aligned circular apertures 47 extending horizontally through the column 39 to the aperture 45 with their axes in the same direction as the axes of apertures 41, 43. A hollow rivet 49 extending through the aperture 41 connects a first electrically conductive leaf spring 51 to the column 39, the leaf spring extending along one side of the column 39 to a point below aperture 47. A wire 53, which is part of the electrical circuit to be described, extends through rivet 49 to leaf spring 51.

A second rivet 55 extends through the lower aperture 43 and connects a second electrically conductive leaf spring 57 to the column 39. Leaf spring 57 extends upwards along the other side of the column 39 to a point above the other aperture 47 located on the other side of the column 39. Another wire 59 extends through the rivet 55 to the leaf spring 57.

A pair of steel balls 61a and 61b are slidably mounted within the respective apertures 47. These balls are retained in the apertures 47 by, and in continuous contact with, the conductive leaf springs 51 and 57, respectively.

A switch rod 63 slidably moves within the aperture 45 and is supported by a holder 65 extending from the column 39 and through which the push rod 63 also may slide. FIG. 4 shows in longitudinal cross-section, the structure of the switch rod 63. Rod 63 includes an elongated cylindrical section 67 which is made of an electrically conductive material such as brass. A cap 69, which is made of any non-conductive material such as plastic, fiberglass or phenolic fiber, extends over a part of the conductive section 67. The conductive section 67 and non-conductive cap 69 include arcuate, circumferential lands 71, 73, respectively, located near each other. Lands 71, 73 are shaped to receive the steel balls 61a and 61b. A square-shaped, circumferential groove 75 extends about conductive section 67 near one end and receives a retainer pin 77.

Another electrically conductive leaf spring 79 is connected to the bottom of support column 39 by a U-shaped bracket 81. One rivet 83 connects the leaf spring 79 to one leg of the bracket 81 while a second hollow rivet 85 extends through the other leg of the bracket 81 and through a circular horizontal aperture 87 extending through the lower part of column 39. A wire 89 extends through the hollow rivet and also is part of the electrical circuit to be described. The free end of the leaf spring 79 is positioned between, and in the path of movement of, the push rod 25 and switch rod 63. Not shown is a removable plastic housing which may be used to protect the entire apparatus of FIG. 3.

The manner in which the apparatus of the present invention provides warning signals when the brake linings 5 of a disc or drum brake have worn to a degree which require repair or replacement will now be described. As long as the linings 5 are not in need of repair or replacement, i.e., the conductive pins 9 are not exposed, the structure of FIG. 3 will be in its set position as shown in solid lines. That is, push rod 25 will be located primarily within the housing 17 and switch rod 63 will be in a position in which the steel balls 61 are resting on the non-conductive lands 73 while being retained therein by the leaf springs 51 and 57.

Now, assume that with the ignition switch on, the brake pedal is depressed for the first time when conductive pins 9 have been first exposed. The pins 9 then will contact the rotor 3 closing an electrical circuit through the car battery and solenoid 15, as will be described. The solenoid 15, therefore, is energized to extend the push rod 25 out from the housing 17. Push rod 25, in turn, forces leaf spring 79 against the switch rod 63 causing the latter to slide to the right as viewed in FIG. 3. This movement of the switch rod 63 causes the steel balls 61 to ride up the faces of lands 73 against the force of the leaf springs 51, 57 and then into the conductive lands 71. The extent of the movement of the switch rod 63 is controlled by the retainer pin 77 which will abut the left side of holder 65.

In this position, both a visual and audio signal may be given to warn of the condition of the brake linings. A circuit for providing a visual signal is made through a battery, ignition switch and lamp (see FIG. 5), wire 53, hollow rivet 49, leaf spring 51 and one steel ball 61a, conductive land 71, the other steel ball 61b and leaf spring 57, hollow rivet 55 and wire 59 leading to ground. The lamp may be located on the dashboard of a vehicle to provide the driver with a visual signal.

A second circuit is closed to generate an audio signal generated by a buzzer which also may be located on the dashboard of the vehicle. This circuit comprises the battery, ignition switch and buzzer (see FIG. 5), wire 89, bracket 81, leaf spring 79, switch rod 63, steel ball 61b, leaf spring 57, rivet 55 and wire 59 leading to ground. Consequently, when the brake pedal is depressed with the ignition switch on, both an audio and visual warning signal is given to the driver.

When the brake pedal is released, linings 5 and conductive pins 9 disengage from the rotor 3, thereby de-energizing the solenoid 15. Push rod 25 is then withdrawn into the housing 17 to its set position thereby breaking the contact between switch rod 63 and leaf spring 79 which swings to its set position. However, switch rod 63 remains in its operative position unaffected by the de-energization of the solenoid 15. As a result, the audio circuit through switch rod 63 and leaf spring 79 is opened thereby de-energizing the buzzer. However, the visual circuit described above remains energized to continue to provide a warning signal indicating the brake linings need repair or replacement (assuming the ignition switch is on). When the brake linings are replaced or repaired, switch rod 63 may be reset by merely manually pushing the rod towards the left, as viewed in FIG. 3, to locate the steel balls 47 on the non-conductive lands 73. The brake warning device of the present invention is thereby ready to give audio and visual warning signals as soon as the new brake linings have worn to a condition that requires repair or replacement.

FIG. 5 shows schematically a wiring diagram for the present invention. The circuit for energizing the solenoid 15 includes the car battery 91 having its negative terminal grounded, wire 95, ignition switch 99, wire 23 including fuse 101, solenoid 15, housing 17 and wire 38 which leads to the connector 13 of conductive pin 9 embedded in the brake linings of brake 1. The audio signal circuit includes the battery 91, wire 95, ignition switch 99, wire 103 including fuse 105, wire 107, buzzer 109, wire 89, bracket 81, leaf spring 79, switch rod 63, steel ball 61b, leaf spring 57, rivet 55 and wire 59 leading to ground. The visual signal circuit is made through battery 91, wire 95, ignition switch 99, wire 103 including fuse 105, wire 111, warning light 113, wire 53, hollow rivet 49, leaf spring 51, steel ball 61a, conductive lands 71, steel ball 61b, leaf spring 57, hollow rivet 55 and wire 59.

The brake warning device of the present invention shown in FIGS. 3 and 5 may be applied to the drum brake 115 shown in FIG. 6. The brake 115 includes a drum 117, brake shoe 119 and brake lining 121. Brake shoe 119 includes an arcuate, vertically extending wall 123 and an arcuate surface 125 perpendicular to wall 123. The brake lining 121 is connected to the brake shoe 119 by rivets 127 embedded within the lining 121 and extending through the wall 123. A contact rod or conductive pin 129, having a circular cross-section 131 and rectangular cross-sectional extension 133, extends through the wall 123 and is embedded a predetermined distance within the brake lining 121. The conductive pin 129 may be made of copper, aluminum, brass or any soft, electrically conductive material. The conductive pin 129 is fixedly housed within a contact rod holder 135 having a circular cross-section together with an enlarged flange portion 137 which abuts the wall 123. The contact rod holder 135 is made of a non-electrically conductive, heat resistant material such as phenolic fiber.

The holder 135 and contact rod 131 are slidably movable through the wall 123 and within the brake lining 121 for purposes of easy installation. However, during use, the holder 135 is held in place with the flange 137 abutting the wall 123 by an assembly 139. This assembly 139 includes a spring loaded, clamp 141 having a base 141a attached to the surface 125 through a rivet 143 and washer 145. Two spring loaded arms 141b and 141c of the clamp 141 surround the holder 135 to clamp it in position. Thus, the rod holder 135 may be removed, together with the contact rod 129, from the lining 121 by separating the arms of the clamp 141 and sliding the holder 135 out of the lining 121. The extension 133 (which also may have a round cross-section) would be connected to wire 38 as extension 13 of conductive pin 9 is connected to wire 38.

Figure 7:
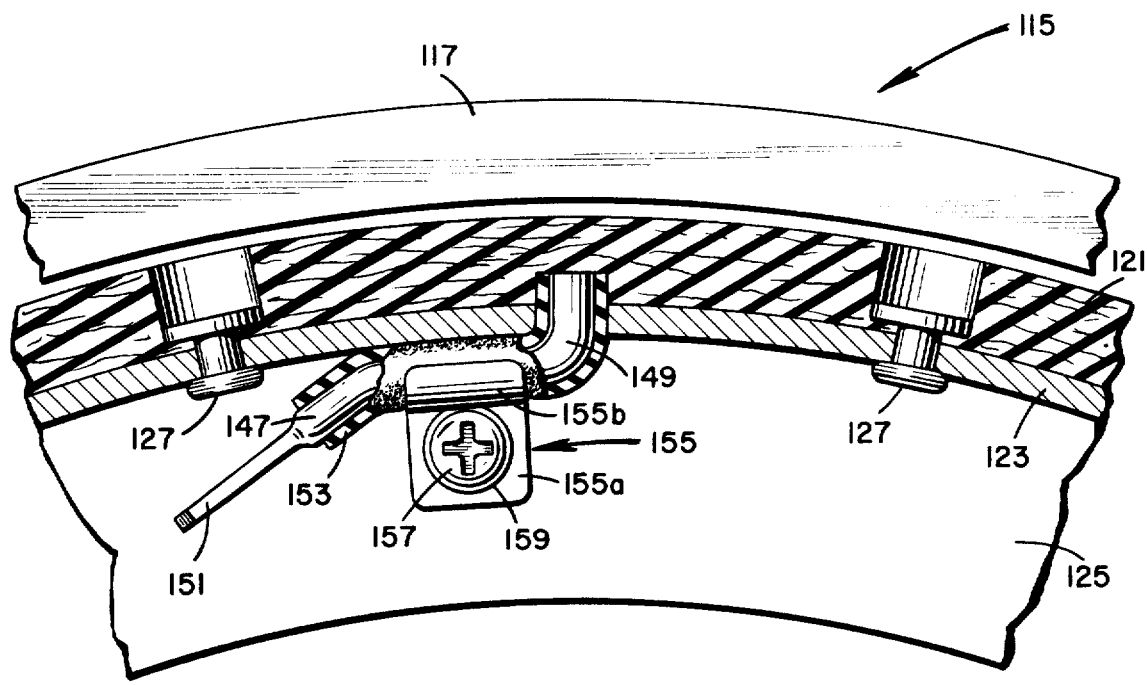
FIG. 7 discloses an enlarged, fragmentary top elevation of a drum brake including an alternative embodiment of a part of the present invention.

FIG. 7 discloses an alternate structure for use with a drum brake 115. In this embodiment a conductive contact rod 147 includes a curved, circular cross-section 149 which extends through the wall 123 and is embedded a predetermined distance within the lining 121. Rod 147 also inlcudes contact rod extension 151, of either flat or round cross-section, which extends from the part 149. Contact rod 147 may be made of aluminum, brass, copper or any soft electrically conductive material. Electrical insulation material 153 insulates the curved section 149. Both the insulation 153 and contact rod 147 are slidably movable through the wall 123 and within the lining 121 for easy installation.

The rod 147 and insulation 153 are clamped by an L-shaped member 155 having its base leg 155a connected to the surface 125 by a screw 157 and washer 159. The vertically extending leg 155b of the clamp 159 includes, near its top thereof, a curved portion which extends over the insulation 153 to retain the contact rod 147 in the position shown during use. Therefore, to install or remove the rod 147, the clamp 155 may be removed by removing the screw 157 from the surface 125. As with the previous embodiments, the wire 38 would be connected to the contact rod extension 151.

What is claimed is:

1. In a vehicle having a brake and brake activator, apparatus for indicating the wear condition of brake linings when the linings have worn a predetermined amount, comprising:
   a. first means energized when the brake linings have worn the predetermined amount;
   b. second means, connected to said first means, for generating a first alarm signal when said first means is first energized, said second means generating said first alarm signal when said first means is subsequently de-energized, said second means including a first switch that is closed when said first means is energized and remains closed when said first means is subsequently de-energized; and c. third means, connected to said first means, for generating a second alarm signal when said first means is first energized, wherein said third means does not generate said second alarm signal when said first means is subsequently de-energized.

2. The apparatus of claim 1 wherein said third means includes a second switch that is closed when said first means is energized and that is opened when said first means is de-energized.

3. The apparatus of claim 2 wherein said first means includes an electrically conductive pin located in the brake linings of a disc brake having a rotor, and said first means is energized when said conductive pin is in contact with said rotor.

4. The apparatus of claim 2 wherein said first means includes an electrically conductive pin located in the brake linings of a drum brake, and said first means is energized when said conductive pin is in contact with the drum.

5. In an automobile having a brake including brake linings and a device with which the linings come in contact intermittently, apparatus for providing warning signals indicating the wear condition of the linings, comprising:

a. a first electro-mechanical circuit means including a solenoid, a first means operable when said solenoid is energized, and an electrically conductive pin embedded a predetermined distance within a brake lining, said solenoid being energized when said conductive pin contacts said device;

b. a second electro-mechanical warning circuit means including a second operable means, responsive to said first operable means, for closing said second warning circuit means when said solenoid is first energized and remaining closed when said solenoid is de-energized; and c. a third electro-mechanical warning circuit means including a third operable means, responsive to said first operable means, for closing said third warning circuit means when said solenoid is energized and opening said third warning circuit means when said solenoid is de-energized, said third operable means being connected between said first and second operable means, said third electro-mechanical means including said second electro-mechanical means.

6. The apparatus of claim 5 wherein said first operable means includes a push rod movable with respect to said solenoid, said second operable means includes a switch rod movable to a closed position and said third operable means includes a first electrically conductive leaf spring having one end in the path of movement of said push rod and said switch rod, said one end of said first leaf spring being spaced apart from said switch rod.

7. The apparatus of claim 6 wherein said second electro-mechanical circuit means comprises a support column including a second electrically conductive leaf spring connected at one end to, and extending along, said column and free at the other end, a third electrically conductive leaf spring connected at one end to, and extending along, said column and free at the other end, a pair of electrically conductive balls movable within said column, the free ends of said second and third leaf springs retaining said balls, respectively, in said column, and wherein said switch rod is movable within said column and includes an electrically conductive and non-conductive part, said balls being movable from said non-conductive part to said conductive part to provide the closed position of said second warning circuit means.

8. The apparatus of claim 7 wherein said third warning circuit means is closed when said one end of said first leaf spring is in contact with said switch rod and when said switch rod is in the closed position.

9. The apparatus of claim 8 wherein said second warning circuit means is closed through said second leaf spring, one of said balls, said conductive part of said switch rod, the other of said balls and said third leaf spring.

10. The apparatus of claim 9 wherein said third warning circuit means is closed through said first leaf spring, said conductive part of said switch rod, one of said balls and said third leaf spring.

11. The apparatus of claim 10 wherein said switch rod comprises a first circumferential conductive land and a second non-conductive circumferential land, said balls being seated within one of said lands.

* * * * *